(No Model.)
C. O. LAMBERT.
GAGE.
No. 435,311. Patented Aug. 26, 1890.
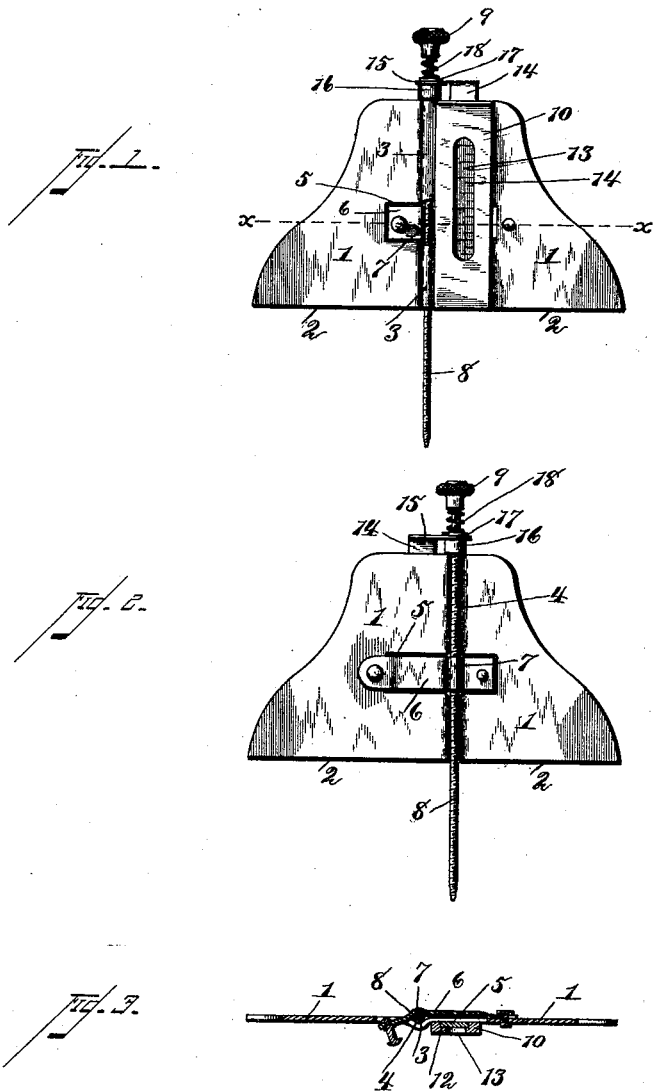
WITNESSES:
INVENTOR:
Charles O. Lambert,
by Samus Daggu &c.
Attorneys.

UNITED STATES PATENT OFFICE.

CHARLES O. LAMBERT, OF ANSONIA, CONNECTICUT.

GAGE.

SPECIFICATION forming part of Letters Patent No. 435,311, dated August 26, 1890.

Application filed March 10, 1890. Serial No. 343,355. (No model.)

*To all whom it may concern:*

Be it known that I, CHARLES O. LAMBERT, a citizen of the United States, and a resident of Ansonia, in the county of New Haven and State of Connecticut, have invented certain new and useful Improvements in Depth-Measuring Instruments; and I do hereby declare that the following is a full, clear, and exact description of the invention, which will enable others skilled in the art to which it appertains to make and use the same.

My invention relates to improvements in instruments of precision for measuring or ascertaining the depth of holes, recesses, or depressions in articles or structures of various kinds, and are technically known as "depth-gages."

I am aware that prior to my invention depth gages or instruments of the character named above have been constructed in which a screw-rod carried by a correspondingly screw-threaded straight edge or plate has been employed for the purpose of ascertaining and indicating the depth of holes or recesses. These constructions have been found objectionable, however, for many reasons, principally because no provision was made for rapidly adjusting the rod, so as to measure different depths, it being necessary, in order to project the rod more or less beyond the straight-edge, to turn the same in its screw-threaded bearings. This is a tedious operation, especially if the screw-threads are very fine, for the purpose of taking delicate and accurate measurements.

The object of my invention is to obviate the above and other objections and to provide a depth-gage in which the measuring-rod may be rapidly adjusted to ascertain the depth of varying holes, while at the same time the measurements may be made with the utmost precision and accuracy.

The device is simple and economical in construction, durable in use, reliable in operation, and not liable to get out of order or become injured by continued use.

The invention consists in a new article composed of a plate having a straight-edge, a vertical screw-threaded groove, a longitudinal slot intermediate the ends of said groove, a spring-arm projecting through said slot and secured at one end to the plate, and a screw-threaded measuring-rod fitting in the screw-threads in the plate and held thereto by means of the spring-arm, as will hereinafter be more fully set forth.

It also consists in certain features of construction and new combinations of parts, which will be hereinafter fully described, and definitely pointed out in the claims.

In the accompanying drawings, Figure 1 is a side elevation of a depth-gage constructed according to my invention. Fig. 2 is a similar view looking from the opposite side. Fig. 3 is a horizontal section on the line $x\,x$, Fig. 1.

In the said drawings, the reference-numeral 1 designates a plate which carries the measuring-rod and indicating-plate. The lower portion of this plate is formed into a straight-edge 2. Centrally, or nearly so, in the plate 1 is formed a rib 3, which is struck up from the plate. This rib is so constructed as to form a screw-threaded groove 4. Intermediate the ends of the groove is a longitudinal slot 5, within which is fitted a spring-arm 6, secured at one end to the plate 1. This arm is provided with a vertical groove or depression 7. The arm 6 normally presses against the measuring-rod 8, the groove 7 embracing said rod and holding it securely within the screw-threaded groove 4. This measuring-rod consists of a metallic bar having a screw-thread extending its entire length, corresponding with the threads in the groove 4, and is provided at its upper end with an operating-knob 9.

Secured to the plate 1, in close proximity to and parallel with the groove 4, is a vertical plate 10, having a recess 12 on its under side and its upper or outer face provided with a slot or opening 13. Within this recess 12 works the reciprocating scale-bar 14, provided with a scale or indicating-marks so graduated with respect to the measuring-bar as to indicate the distance the said bar projects beyond the straight-edge, and consequently the depth of the hole in which it is inserted, as will be obvious to those skilled in the art to which the invention pertains. At its upper end the bar 14 is provided with an arm 15, having a central perforation through which the measuring-rod passes.

16 designates a collar fixed to the rod 8, and upon which the arm 15 rests, being held thereto by means of the loose collar or washer 17 and the coiled spring 18, encircling the rod 8 between said washer and the knob 9.

The operation of the device is as follows: The straight-edge 2 of plate 1 is placed upon the face of the article containing the hole or recess to be measured, so that the rod 8 will project therein. The spring-arm 6 is pushed back by means of knob 19, which allows said rod to be released from engagement with the screw-threads in groove 4, and drop to the bottom of the hole or recess. Arm 6 is then permitted to return to its normal position, and the rod is given a turn or two, either to the right or left in order to properly adjust it, when the depth can readily be ascertained by consulting the indicating or scale bar, as will be obvious. It will thus be seen that the measuring-rod can be speedily and rapidly adjusted by simply manipulating the spring-arm so as to throw it out of engagement with the screw-threaded groove.

I design to make the plate 1 and arm 6 out of thin steel, striking or stamping up the grooves therein; but it is obvious that they may be otherwise formed without departing from my invention.

Having thus described my invention, what I claim is—

1. As a new article, a depth-gage consisting of a plate having a straight-gage, a vertical screw-threaded groove, a slot intermediate the ends of said groove, a spring-arm having a groove secured to said plate and projecting through said slot, and a screw-threaded measuring-rod fitting in said screw-threaded groove and held therein by the spring-arm, substantially as described.

2. The combination, with a plate having a vertical screw-threaded groove, a slot intermediate the ends of said groove, a spring-arm secured to said plate projecting through the slot and provided with a vertical groove, of a measuring-rod fitting within said groove and provided with a screw-thread corresponding with the screw-thread in said groove in the plate, and an indicating or scale bar connected with said measuring-bar, substantially as described.

3. The combination, with the plate 1, having straight-edge 2, screw-threaded groove 4, and longitudinal slot 5 intermediate the ends thereof, the spring-arm 6, having groove 7, and secured to said plate, of the screw-threaded rod 8, plate 10, having recess 12 and slot 13, the scale-bar 14, having arm 15 encircling bar 8, the collar 16, washer 17, and coiled spring 18, substantially as described.

In testimony that I claim the foregoing as my own I have hereunto affixed my signature in presence of two witnesses.

CHARLES O. LAMBERT.

Witnesses:
CHARLES MCGOVERN,
JOHN D. BALLOU.